(12) United States Patent
Hehn et al.

(10) Patent No.: US 9,954,334 B2
(45) Date of Patent: Apr. 24, 2018

(54) BRUSH FOR A COMMUTATOR AND COMMUTATOR MOTOR HAVING THE BRUSH

(71) Applicant: BROSE FAHRZEUGTEILE GMBH & CO. KOMMANDITGESELLSCHAFT, WUERZBURG, Wuerzburg (DE)

(72) Inventors: Hermann Hehn, Leinach (DE); Martin Pfister, Wiesentheid (DE); Rainer Schoele, Leinach (DE)

(73) Assignee: Brose Fahrzeugteile GmbH & Co. Kommanditgesellschaft, Wuerzburg, Wuerzburg (DE)

( * ) Notice: Subject to any disclaimer, the term of this patent is extended or adjusted under 35 U.S.C. 154(b) by 567 days.

(21) Appl. No.: 14/554,360

(22) Filed: Nov. 26, 2014

(65) Prior Publication Data
US 2015/0076958 A1    Mar. 19, 2015

Related U.S. Application Data

(63) Continuation of application No. PCT/EP2013/001455, filed on May 16, 2013.

(30) Foreign Application Priority Data

May 26, 2012   (DE) .................. 10 2012 010 481

(51) Int. Cl.
| | |
|---|---|
| *H01R 39/38* | (2006.01) |
| *H01R 39/26* | (2006.01) |
| *H01R 43/12* | (2006.01) |
| *H02K 13/00* | (2006.01) |

(Continued)

(52) U.S. Cl.
CPC .......... *H01R 39/381* (2013.01); *H01R 39/26* (2013.01); *H01R 43/12* (2013.01); *H02K 13/006* (2013.01); *H01R 39/32* (2013.01); *H01R 39/415* (2013.01)

(58) Field of Classification Search
CPC ...... H02K 13/006; H01R 39/20; H01R 39/26; H01R 39/27; H01R 39/32; H01R 39/381; H01R 39/383; H01R 39/385; H01R 39/415; H01R 43/12
USPC ....... 310/219, 220, 238, 239, 242, 248, 249, 310/253, 71
See application file for complete search history.

(56) References Cited

U.S. PATENT DOCUMENTS

| | | |
|---|---|---|
| 1,831,144 A | 11/1931 | Shearer |
| 1,878,132 A | 9/1932 | Hall |
| 2,790,100 A | 4/1957 | Caputo et al. |

(Continued)

FOREIGN PATENT DOCUMENTS

| | | |
|---|---|---|
| CN | 1700533 A | 11/2005 |
| DE | 2157596 A1 | 5/1973 |

(Continued)

*Primary Examiner* — Bernard Rojas
*Assistant Examiner* — Rashad Johnson
(74) *Attorney, Agent, or Firm* — Laurence A. Greenberg; Werner H. Stemer; Ralph E. Locher (57) ABSTRACT

A method produces a brush for a commutator motor, in particularly for a motor vehicle fan, for electrically contacting a connected contact lead to a commutator via a spring-loaded contact with a commutator. Accordingly, a brush material, particularly carbon dust, is poured into a cuboid matrix and compressed by a plunger in a contact direction for forming the brush.

9 Claims, 4 Drawing Sheets

(51) Int. Cl.
*H01R 39/32* (2006.01)
*H01R 39/415* (2006.01)

(56) References Cited

U.S. PATENT DOCUMENTS

| | | | |
|---|---|---|---|
| 3,906,624 A | 9/1975 | Ohta | |
| 4,112,321 A * | 9/1978 | Wan | H01R 39/40 |
| | | | 310/242 |
| 5,495,134 A | 2/1996 | Rosenblum | |
| 5,563,467 A | 10/1996 | Csermak et al. | |
| 5,626,803 A | 5/1997 | Siegemund | |
| 5,870,026 A * | 2/1999 | Challenger | H01R 39/58 |
| | | | 310/245 |
| 6,744,170 B1 | 6/2004 | Du et al. | |
| 7,042,121 B2 | 5/2006 | De Filippis et al. | |
| 7,298,065 B2 * | 11/2007 | Lau | H01R 39/381 |
| | | | 310/242 |
| 8,154,169 B2 * | 4/2012 | Qin | H01R 39/40 |
| | | | 310/239 |
| 2003/0151328 A1 * | 8/2003 | Cutsforth | H01R 39/38 |
| | | | 310/239 |
| 2005/0242683 A1 | 11/2005 | Lau | |
| 2012/0062067 A1 * | 3/2012 | Shim | H01R 39/383 |
| | | | 310/239 |
| 2017/0005540 A1 * | 1/2017 | Hirabayashi | H02K 5/143 |
| 2017/0025916 A1 * | 1/2017 | Hamagishi | H02K 5/148 |

FOREIGN PATENT DOCUMENTS

| | | |
|---|---|---|
| DE | 2311360 A1 | 9/1974 |
| DE | 3328683 A1 | 2/1985 |
| DE | 4226553 A1 | 2/1994 |
| DE | 69405700 T2 | 2/1998 |
| DE | 10355982 A1 | 6/2005 |
| DE | 69919239 T2 | 7/2005 |
| EP | 0935318 A2 | 8/1999 |
| EP | 1592112 A1 | 11/2005 |
| EP | 1621773 A1 | 2/2006 |
| GB | 1379145 A | 1/1975 |
| JP | H07183075 A | 7/1995 |
| WO | 9508855 A1 | 3/1995 |

* cited by examiner

BRUSH FOR A COMMUTATOR AND COMMUTATOR MOTOR HAVING THE BRUSH

CROSS-REFERENCE TO RELATED APPLICATION

This is a continuation application, under 35 U.S.C. § 120, of copending international application No. PCT/EP2013/001455, filed May 16, 2013, which designated the United States; this application also claims the priority, under 35 U.S.C. § 119, of German patent application No. DE 10 2012 010 481.2, filed May 26, 2012; the prior applications are herewith incorporated by reference in their entirety.

BACKGROUND OF THE INVENTION

Field of the Invention

The invention relates to a brush and a commutator motor having a brush of this type, in particular of a motor vehicle fan.

Motor vehicles having an internal combustion engine generate a considerable amount of heat during operation. In order to maintain the operating temperature of the internal combustion engine and also for the operation of an air conditioning unit, a fluid cooling medium is generally used that in turn must be cooled. This is generally performed by a cooling network that is influenced by an airflow that exchanges heat with the cooling medium. By way of example, the cooling medium is conveyed in ducts that are integrated into the cooling network. Since in particular in the case of low vehicle speeds, the airflow is normally not sufficient for cooling purposes, by way of example European patent EP 1 621 773 A1 (corresponding to U.S. Pat. No. 7,042,121) discloses an electrical main fan by which the airflow is amplified.

The main fan is arranged downstream of the cooling network in the direction of flow. The air is sucked through the cooling network with the aid of an impeller wheel of the fan and conveyed to the internal combustion engine. The impeller wheel is connected to a rotor shaft of the electric motor or rather its rotor (armature) by a central rotor shaft coupling.

A commutator motor is typically used as an electric motor. A number of carbon brushes that lie in corresponding brush holders are arranged around a central commutator and the carbon brushes are in electrical contact with the commutator and for this purpose brush over its commutator segments during the rotating operation of the motor. A connecting wire that runs perpendicular to the contacting direction is fastened to each brush. During operation of the electric motor, the brushes are worn down as a result of friction as they brush over the commutator. The abraded particles that are produced as a result can settle between the individual commutator segments and short circuit the segments. In addition, the friction heat that is produced as a result can cause the brushes and the carbon dust that is produced to ignite.

SUMMARY OF THE INVENTION

The object of the invention is to provide a particularly suitable brush and a particularly suitable commutator motor having a brush, wherein the brush is to be comparatively durable and resistant to abrasion, suitably comparatively simple and cost-effective to assemble in the commutator motor and also in particular comparatively cost-effective to produce.

A matrix is filled with a brush material in order to produce the brush. The brush material is in particular carbon dust that is mixed with a fixing medium. The term 'matrix' is understood to mean a casting mold whose cavity at least in part corresponds to the outer form of the cast part, in other words the brush. The brush material that is located within the matrix is compressed by a pressing tool and by way of example heated. The movement direction of the pressing tool is along a contacting direction. The contacting direction describes the direction in which the brush that is provided is pressed by a resilient element against a commutator of an electric motor and the direction corresponds to the brush lengthwise direction of the brush that is produced. The pressing tool is consequently in contact with the future contact surface between the preferably rectangular-shaped brush and the commutator or the opposite end of the brush. It is preferred that two pressing tools are used in order to produce the brush and one of the pressing tools is in contact with the future contact surface and the other pressing tool is in contact with the opposite end of the brush.

The remaining delimiting surfaces of the brush are defined by the matrix. These delimiting surfaces are consequently produced in a smooth and tolerance free manner. The delimiting surfaces do not contain any burrs or deformations. It is therefore not necessary to machine finish the delimiting surfaces by a mill or the like in order to ensure a simple assembly of the brush within a brush holder of the electric motor and to ensure a reliable operation of the electric motor.

The brush holder forms an at least in part form-locking receiving arrangement of the brush and the brush can be displaced within the brush holder in the radial direction of the electric motor towards the commutator. A form-locking connection is one that connects two elements together due to the shape of the elements themselves, as opposed to a force-locking connection, which locks the elements together by force external to the elements. If the delimiting surfaces were uneven, the brushes could become wedged and the functionality of the electric motor that is also described as a commutator motor would no longer be ensured. As a result of the pressing direction of the one or multiple pressing tools, the brush material is aligned and compressed along a preferred direction, namely the contacting direction. The brush that is produced as a result contains an increased stability and friction resistance in this direction. The operation of the electric motor is therefore comparatively more reliable since both the amount of abrasion as well as the probability of the brush breaking off while brushing over the commutator is reduced.

Prior to the compression process by the pressing tool, a connecting wire is preferably placed in the brush material. In particular, the connecting wire is entirely surrounded by the brush material in the region of the brush that is produced as a result. By way of example, the matrix is filled with the brush material to a specific level, in a subsequent step the connecting wire is placed in the matrix, and in a further step the matrix is filled with the remaining brush material. After the subsequent compression, the connecting wire is held by the brush in a form-locking and a force-locking manner. The connecting wire runs within the brush in a manner that is essentially parallel to the contacting direction, wherein however it is also feasible for the connecting wire to run in a meandering manner with the preferred direction in the contacting direction in order to ensure that the connecting wire is anchored in an improved manner with the brush.

The connecting wire exits preferably on the end of the brush, the end being opposite the contact surface. In particular, for this purpose the pressing tool or the base of the matrix that is arranged on this side contains a bore through which the connecting wire is fed into the casting mold for the brush. As a result of a production process of this type, it is possible to omit a complex connection of the connecting wire to the brush, by way of example by drilling a receiving arrangement into the brush and subsequently adhering the connecting wire at that location.

The brush contains a projection piece that is formed perpendicular to the contacting direction or rather to the brush lengthwise direction. By way of example, an equalizing channel is integrated into the matrix for this purpose. The projection piece renders it possible to handle the brush during assembly of the brush and during operation of the electric motor, wherein the contact surface can be provided free from deformations of this type. Provided that the connecting wire is connected to the opposite end, the connecting wire is not impaired by contact with a tool that is operating together with the projection piece.

The projection piece is expediently embodied in a generally rectangular-shaped manner. Consequently the projection piece is comparatively robust. In addition, it is consequently rendered possible to form the brush with the projection piece in a comparatively consistent manner. In addition, the space requirement is comparatively small, wherein however a reliable contact with the projection piece is possible.

The projection piece is advantageously arranged on an axial face of the brush that is subsequently also described as an axial surface. The term "axial face or rather axial surface" is understood to mean a face or rather surface of the brush that delimits the brush in the assembled state in the axial direction of the electric motor. By virtue of positioning the projection piece in this manner, consideration is given to the comparatively small amount of installation space required by the brush carrier, also described as the brush plate, on which the brush holders are located.

A longitudinal groove that runs in the contacting direction is suitably integrated in the axial surface and the groove extends as far as the projection piece. By way of example, a corresponding longitudinal connecting piece is integrated into the matrix. As a consequence, in particular in connection with the equalizing channel that is integrated in the matrix, a comparatively large effective axial height of the projection piece can be achieved, wherein the projection piece only protrudes beyond a part of this axial height from the axial surface of the brush. The longitudinal groove can additionally or alternatively also be used as a guiding surface for the purpose of producing the projection piece.

Since the projection piece only enlarges the construction height of the brush in the axial direction, it is possible to arrange further components of the electric motor near to the brush on the brush carrier. Alternatively or in combination therewith the projection piece is offset from the contact surface of the brush and is preferably adjacent to the end of the brush that is opposite thereto. In this manner, any to a large extent pronounced abrasive wear of the brush and the accompanying shortening of the brush in the contacting direction do not damage the projection piece.

It is preferred that the contact surface of the brush on the commutator is curved towards the interior and the curvature corresponds to the rounded outer surface of the cylindrical commutator. In this manner, the region of the contact surface of the brush is enlarged on the commutator and an electrical voltage drop that is produced as a result between the two is reduced.

A receiving groove is integrated into the brush, in order to at least in part receive the resilient element that presses on the commutator. The resilient element is suitably held in the receiving groove in a form-locking manner so that no further fastening measures are necessary for the purpose of connecting the resilient element to the brush, wherein the region in which the resilient element has an effect on the brush is defined by the receiving groove.

It is particularly preferred that the resilient element is embodied as a leaf spring. In other words the resilient element is produced from a resilient steel strip that is rolled onto its ends. In the case of a suitable fastening of the ends on the brush carrier, the brush is pressed against the commutator. In this case, the receiving groove is preferably at least in part integrated in such a manner that it extends circumferentially into the brush or is located on the end of the brush that is opposite the contact surface.

The brush carrier of the electric motor suitably contains a bracket that has a region for latching with the projection piece. During assembly of the electric motor, the brush is initially inserted into the brush holder of the brush carrier and the resilient element is placed on or connected to both the brush as well as to the brush carrier. Expediently hereafter, the connecting wire is electrically contacted with electrical components of the electric motor that are arranged on the brush plate, such as a choke coil. As a consequence of the electrical contact, the brush is moved within the brush holder in a direction counter to the pressing direction radially towards the exterior and latches with the bracket. In this case, the bracket engages at the projection piece and hinders a movement of the brush in the pressing direction that is produced by the resilient element.

In a subsequent procedural step, the commutator that is mounted in a rotatably fixed manner on a shaft is inserted into a central opening of the brush carrier and the shaft is secured in the axial direction, by way of example by bearings. In a subsequent step, the bracket is opened and the brush is released. The brush is then moved against the commutator by the resilient loading. A comparatively simple production process of the commutator motor is rendered possible by the bracket since the brushes can already be assembled in advance on the brush plate. The subsequent assembly of a rotor that contains the commutator is comparatively simple, particularly the latched brush is held spaced apart from the commutator by the bracket. In other words, the brush does not hinder the insertion of the commutator.

It is preferred that the bracket is connected to and in particular formed on the brush holder. It is preferred that the bracket is located on an axial side of the brush holder. The production of the brush carrier is simplified by its single-part embodiment and the amount of installation space that is required is reduced as a result of the arrangement on the brush holder. In addition, further elements of the electric motor that are arranged on the brush carrier are not impaired by the bracket. Consequently, it is possible to use a previously existing layout of the brush carrier. It is only necessary to adjust the one or multiple brush holders of the brush carrier.

The bracket expediently extends in the contacting direction of the brush. In particular, the bracket is pivoted about an axis for the purpose of unlatching the projection piece of the brush and the axis is perpendicular to the contacting direction, wherein for example a film hinge is used. As a result of the bracket being of this type of shape, the bracket is located in a region of the electric motor that is not occupied by any further components of the electric motor which is why a bracket of this type can be integrated into an existing electric motor in a comparatively uncomplicated manner.

The connecting wire is suitably s-shaped in the region of the brush. In this manner, a reliable contact arrangement of the brush with the connecting wire is also ensured in the case of a comparatively extensive amount of abrasive wear of the brush, since as a result of the s-shape, a sufficient equalizing length of the connecting wire is made available that compensates for the abrasive wear. Directly after assembly, the space of the equalizing length of the connecting wire is advantageously defined and possible other components of the electric motor are not hindered or impaired.

Other features which are considered as characteristic for the invention are set forth in the appended claims.

Although the invention is illustrated and described herein as embodied in a brush for a commutator motor and a commutator motor having the brush, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Parts that correspond to one another are provided with identical reference numerals in all figures.

Figure 1:
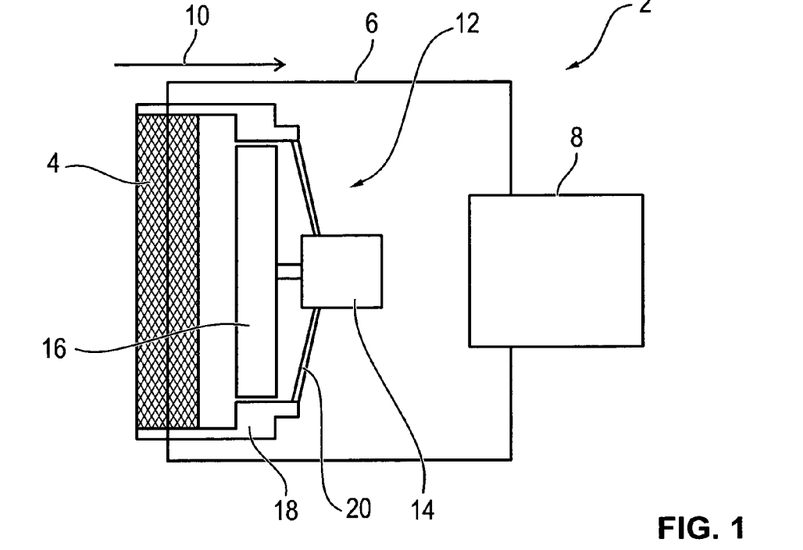
FIG. 1 is a diagrammatic, side view of a main fan having an electric motor.

Referring now to the figures of the drawings in detail and first, particularly to FIG. 1 thereof, there is shown schematically in a simplified manner a side view of a cooling fan 2 of a motor vehicle, in other words a motor vehicle fan. The cooling fan 2 contains a cooling network 4 through which a cooling duct 6 is guided. A cooling fluid is located within the cooling duct 6 and the cooling fluid is kept in circulation by a non-illustrated pump. The cooling fluid is conveyed through an internal combustion machine 8 and is heated by the internal combustion engine, wherein the internal combustion engine 8 is cooled. The heated cooling fluid is then conveyed through the cooling network 4 that is influenced by airflow. The direction of the airflow is along an airflow direction 10 that essentially corresponds to the main direction of travel of the motor vehicle.

The airflow is amplified or in the case of the vehicle being stationary the airflow is generated by a fan 12 that is described as a main fan 12 and that is arranged in the airflow direction 10 downstream of the cooling network 4. This is performed by an electric motor 14 that sets an impeller wheel 16 into a rotational movement. In addition, the airflow is conveyed to the internal combustion engine 8 by the impeller wheel 16 and the internal combustion engine is consequently influenced from the exterior with the airflow. This leads to the internal combustion engine 8 being additionally cooled. The impeller wheel 16 is arranged within a cooling frame 18 by which the airflow is directed. Brushes or a specific contour is or are arranged in the transition region between the frame 18 and the impeller wheel 16 and the specific contour prevents a so-called air leakage between the two components. The electric motor 14 is fastened to the frame 18 by struts 20. The struts 20 are produced as one piece with the frame 18, by way of example in a synthetic material injection method.

Figure 2:
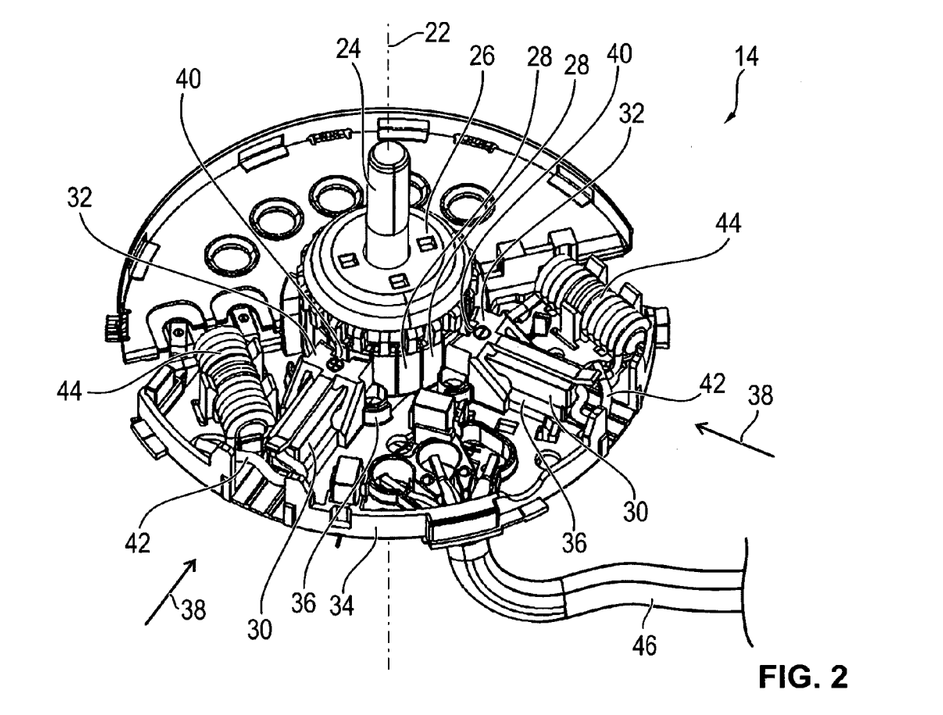
FIG. 2 is a diagrammatic perspective view of a brush carrier of the electric motor.

FIG. 2 illustrates in a perspective manner the electric motor 14 in which a housing and further components are not illustrated for the purpose of improving visibility. The electric motor 14 contains in a central area a shaft 24 that is mounted in such a manner that it can rotate about an axis of rotation 22. A commutator 26 having twenty commutator segments 28 that are electrically insulated with respect to one another is fastened to the shaft 24 in a rotatably secure manner. Two brushes 30 that extend in a radial direction are located offset essentially at 90° in relation to the axis of rotation 22. The brushes 30 are at least in part arranged in a form-locking manner within brush holders 32 of a brush carrier 34 that is produced from synthetic material and the brush holders are embodied as one piece with the brush carrier. Each brush 30 is pressed against the commutator 26 by a leaf spring 36 in a respective contacting direction 38 that runs radially inwards and runs perpendicular to a contact surface 40 between the brush 30 and the commutator 26.

The brushes 30 brush over the commutator segments 28 in the case of a rotational movement of the shaft 24 and are consequently contacted by the commutator segments in an electrical manner. A connecting wire 42 is fastened to the contact surface 40 between each brush 30 and the end of the respective brush 30 that lies opposite the commutator 26. The connecting wires 42 are contacted in an electrical manner in each case by a choke coil 44 in order to reduce disruptive feedback within a supply current and the choke coil is clipped to the brush carrier 34 and is electrically connected to an on board electrical system of the motor vehicle by way of a non-illustrated fuse and a supply line 46.

Figure 3:
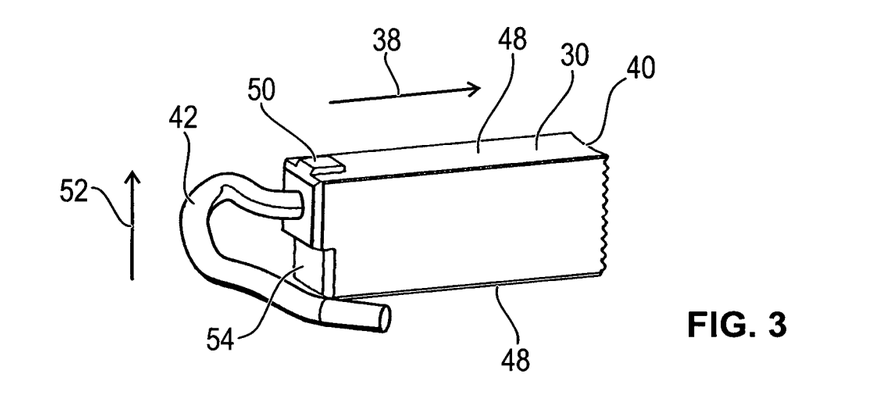
FIGS. 3-5 are diagrammatic perspective views of a brush having projection pieces according to the invention.
Figure 4:
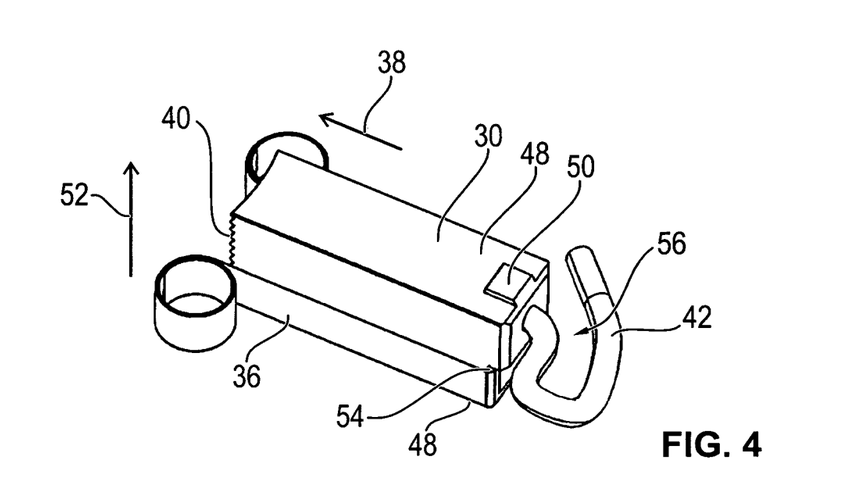
Figure 5:
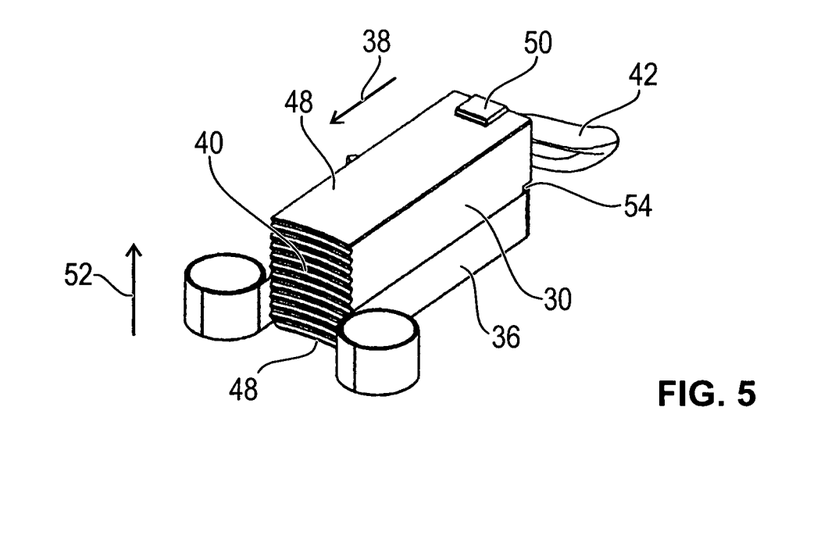
Figure 6:
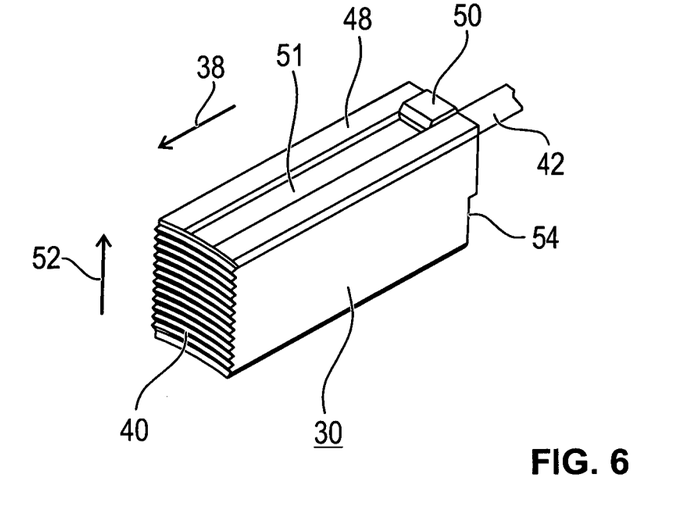
FIG. 6 is a perspective view of the brush having a longitudinal groove and the projection pieces in accordance with FIG. 5.

FIG. 3 illustrates a perspective view of one of the brushes 30 and FIG. 4 and FIG. 5 illustrate a perspective view of the brush 30 and the associated leaf spring 36. FIG. 6 illustrates a variant of the brush 30. The brush 30 is essentially rectangular-shaped, wherein the corrugated contact surface 40 is embodied in a curved manner. The curvature corresponds to the curve of the commutator 26 so that in the assembled state, the brush 30 lies entirely against the commutator 26 with the contact surface 40 that delimits the brush 30 in the pressing-on direction 38. A rectangular projection piece 50 is formed on one of the two axial surfaces 48 of the brush 30 and the projection piece lies adjacent to the end of the brush 30 that is connected to the connecting wire 42.

As is evident in FIG. 6, in accordance with the variant of the brush 30, a longitudinal groove 51 that runs in a contacting direction 38 is integrated into one of the two axial surfaces 48 of the brush and the groove 51 extends as far as the projection piece 50. The axial surfaces 48 are the side surfaces of the rectangular-shaped brush 30 that delimit the brush in an axial direction 52 that runs parallel to the axis of rotation 22.

A comparatively large effective height of the projection piece 50 can be achieved in the axial direction 52 by the longitudinal groove 51, wherein the projection piece 50 itself protrudes beyond a part of the axial height and beyond the axial surface 48 of the brush 30. The longitudinal groove 51 can thus comprise by way of example a groove depth of 0.5 mm and the groove depth leads to its effective projection piece height of 1 mm in a particularly effective manner as far as production technology is concerned in the case of a projection piece 50 that protrudes beyond the axial surface 48 by e.g. likewise 0.5 mm. The longitudinal groove 51 can also be used as a guiding surface.

A receiving groove 54 is integrated into the end of the brush that lies opposite the contact surface 40, whereby the end contains an L-shaped cross section along a section surface that is defined by the contacting direction 38 and the axial direction 52. In the mounted state, the leaf spring 36 is arranged in a positive locking manner within the receiving groove 54. A connecting wire 42 exits the brush 30 above the receiving groove 54 and is embodied in an essentially s-shaped manner in the directly adjacent region 56, as is illustrated in FIG. 4.

Figure 7:
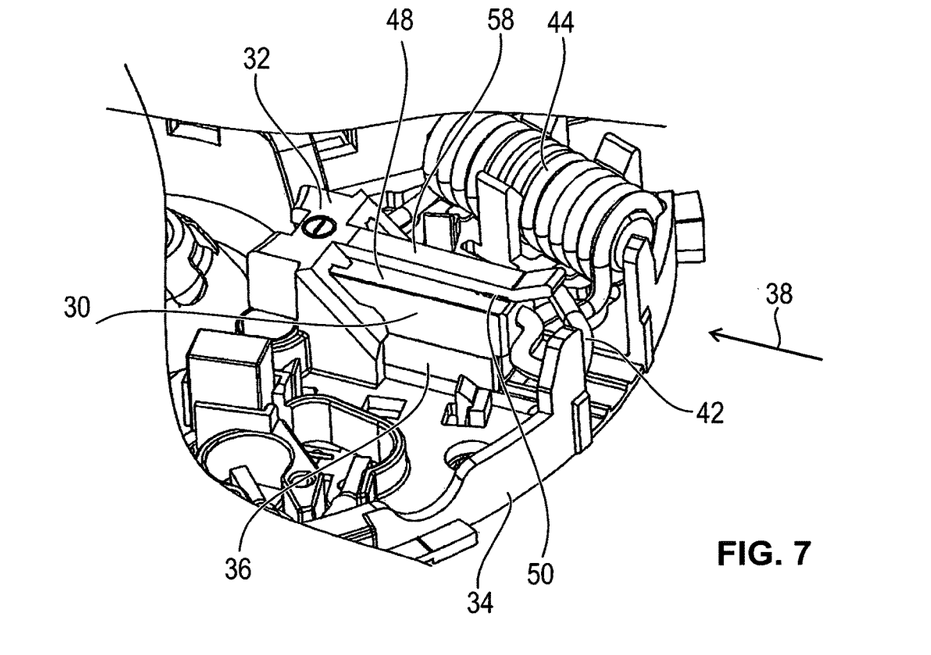
FIG. 7 is a perspective view of a detail of the brush carrier having the brush.

FIG. 7 illustrates the brush 30 during the process of assembling the commutator motor 14. The brush 30 is held back by a bracket 58 that is in contact with the projection piece 50 with respect to the force that is exerted by the leaf spring in the contacting direction 38 and consequently is spaced apart from the central opening of the brush carrier 34 within which the commutator 26 lies in the assembled state. The bracket 58 that extends in the contacting direction 38 is formed on one end on the brush holder 32 and the free end that is formed is coupled to the projection piece 50 of the brush 30. After the commutator 26 is assembled, the brush 30 and the bracket 58 are unlatched whereby the brush 30 is pressed in the axial direction 38 under the free ends of the bracket 58. The brush 30 is released by the bracket bending away from the brush 30. In the case of the bracket 58 being brought into its original position, the projection piece 50 is located below the free end or in the contacting direction 38, offset in relation to the free end of the bracket 58 which is why the projection piece and bracket do not latch again. On the contrary, the brush 30 is pressed unhindered against the commutator 26 by the leaf spring 36 and any abrasive wear that occurs as a result is compensated for during operation of the electric motor 14. Consequently, the connecting wire 42 and the commutator 26 are contacted in an electrical manner by way of the brush 30. In the case of replacing or re-adjusting the commutator 26, the brush 30 is pressed radially outwards in the opposite direction to the contacting direction 38 until the projection piece 50 and the bracket 58 latch again. After the projection piece and bracket have latched, the commutator 26 can be removed or accordingly adjusted unhindered.

Figure 8:
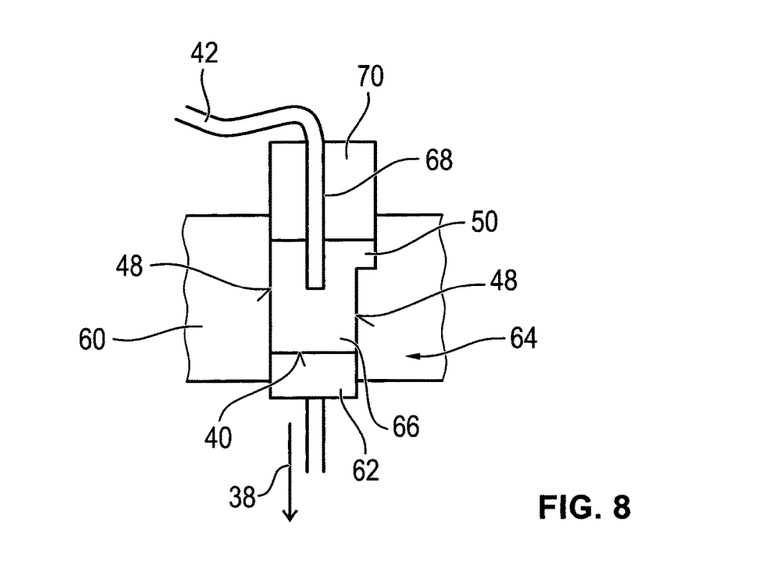
FIG. 8 is an illustration schematically showing a production process of the brush.

FIG. 8 illustrates schematically and in a simplified manner the process of producing the brush 30. A mold 64 that is formed by a matrix 60 and a lower pressing tool 62 is filled up to half with a brush material 66, carbon dust. The form of the lower pressing tool 62 defines the form of the contact surface 40 and the form of the matrix 60 amongst others defines the form of the axial surfaces 48. The connecting wire 42 is guided into the mold through a central bore 68 within an upper pressing tool 70 and the mold is closed with the upper pressing tool 70. The upper pressing tool 70 is located on the side of the mold 64 that lies opposite the lower pressing tool 62. The mold 66 also widens at this location in order to form the projection piece 50. In a subsequent step, the remaining free part of the mold 64 is filled with the brush material 66 and the part of the connecting wire 42 that is located within the mold is entirely encompassed by the brush material.

In a subsequent procedural step, the two pressing tools 62, 70 are pressed against one another, as a result of which the carbon dust is compressed. The direction of movement of the pressing tools 62, 70 is along the contacting direction 38. Pressure is consequently applied to the brush material 66 by the later the contact surface 40 and the end that is opposite the contact surface 40. In addition, the matrix 60 is heated and the brush material 66 is consequently baked onto the brush 30 which fastens the connecting wire 42 to the brush 30. The brush material 66 is conveyed in this preferred direction in a crystalline state as a result of the pressing direction along the contacting direction 38 which increases the resistance capability of the brush 30 with respect to abrasive wear of the commutator 26 during operation of the electric motor 14. Furthermore, all the side surfaces that extend parallel to the contacting direction 38, amongst others the axial surfaces 48, are free from burrs and are smooth as a result of the form of the matrix 60. As a result of the production method, any inaccuracy and deviations of the brush 30 from the mold 64 can only occur in the region of the contact surface 40 and the opposite end of the brush 30. Consequently, the brush 30 that is produced is comparatively a precise fit to the brush holder 32 and it is possible to omit a step of machine finishing the side surfaces of the brush 30 that extend parallel to the contacting direction 38.

The invention is not limited to the above described exemplary embodiment. On the contrary, other variants of the invention can also be derived therefrom by the person skilled in the art without departing from the subject matter of the invention. In particular in addition, all the individual features that are described in relation to the exemplary embodiment can also be combined with one another in other ways without departing from the subject matter of the invention.

The following is a summary list of reference numerals and the corresponding structure used in the above description of the invention:

2 Cooling Fan
4 Cooling Network
6 Cooling Duct
8 Machine
10 Airflow Direction
12 Fan
14 Electric Motor
16 Impeller Wheel
18 Cooling Frame
20 Support
22 Axis of Rotation
24 Shaft
26 Commutator
28 Commutator Segment
30 Brush
32 Brush Holder
34 Brush Carrier
36 Leaf Spring
38 Contacting direction 40 Contact surface
42 Connecting Wire
44 Choke Coil
46 Supply Line
48 Axial Surface
50 Projection Piece
51 Longitudinal Groove
52 Axial Direction
54 Receiving Groove
56 Region
58 Bracket
60 Matrix
62 Lower Pressing tool
64 Mold
66 Brush Material
68 Bore
70 Upper Pressing tool

The invention claimed is:

1. A portion of a commutator motor, comprising:
a brush carrier having a brush holder and a spring-loaded brush lying in said brush holder; and
a commutator, a brush plate, and a connecting wire attached to said spring-loaded brush;
said spring-loaded brush including a leaf spring-like resilient element for providing spring-loaded contact on said commutator while forming a contacting surface;
leaf spring-like resilient element for providing an electrical contact between said connecting wire and said commutator;
said spring-loaded brush including a projection piece formed integrally in a perpendicular manner with respect to a contacting direction, said spring-loaded brush including a receiving groove receiving said leaf spring-like resilient element;
said spring-loaded brush including a brush formed from a rectangular matrix and a brush material filling said rectangular matrix by being pressed into rectangular matrix in said contacting direction by a pressing tool;
said brush having an end opposite said contacting surface, said end of said brush formed with said receiving groove resulting in said end said brush having an L-shaped diameter along a cut surface defined by said contacting direction and an axial direction;
said leaf spring-like resilient element mounted in a state causing said leaf spring-like resilient element to be form-lockingly formed within said receiving groove;
said connecting wire exiting said brush from above said receiving groove;
said leaf spring-like resilient element formed by a spring steel band having rolled-up ends, said rolled-up ends of said leaf spring-like resilient element being fastened on said brush carrier such that said brush is pressed against said commutator; and
said brush plate having a bracket for latching with said projection piece during an assembly process.

2. The portion of the commutator motor according to claim 1, wherein said bracket is formed on said brush holder.

3. The portion of the commutator motor according to claim 1, wherein said connecting wire is placed or formed in an s-shaped manner adjacent said brush.

4. The portion of the commutator motor according to claim 1, wherein said projection piece is embodied in an essentially rectangular-shaped manner.

5. The portion of the commutator motor according to claim 1, wherein said brush has an axial surface delimiting said brush in the axial direction, and said projection piece is disposed on said axial surface or is disposed offset from said commutator.

6. The portion of the commutator motor according to claim 5, wherein said axial surface is formed with a longitudinal groove integrated therein, and said longitudinal groove runs in the contacting direction and extends to said projection piece.

7. The portion of the commutator motor according to claim 1, wherein said contact surface is formed in a manner corresponding to a surface of said commutator.

8. The portion of the commutator motor according to claim 1, wherein said projection piece is disposed offset from said commutator in the contacting direction, and is disposed on an end of the brush.

9. The portion of the commutator motor according to claim 1, wherein said bracket runs in the contacting direction.

* * * * *